United States Patent [19]
Stimson

[11] Patent Number: 5,304,894
[45] Date of Patent: * Apr. 19, 1994

[54] METALLIZED GLASS SEAL RESISTOR COMPOSITION

[75] Inventor: Grant L. Stimson, Davison, Mich.

[73] Assignee: General Motors Corporation, Detroit, Mich.

[*] Notice: The portion of the term of this patent subsequent to Jan. 3, 2006 has been disclaimed.

[21] Appl. No.: 939,741

[22] Filed: Sep. 2, 1992

[51] Int. Cl.$^5$ .............................................. H01J 7/44
[52] U.S. Cl. ........................................ 315/58; 315/56; 315/71; 313/118; 313/136; 252/507; 252/510
[58] Field of Search ................ 315/58; 262/506, 507, 262/508, 509, 512; 313/118, 136, 136 X

[56] References Cited
U.S. PATENT DOCUMENTS

| | | |
|---|---|---|
| 2,760,875 | 8/1956 | Schwartzwalder et al. .......... 106/46 |
| 3,909,459 | 9/1975 | Friese et al. ........................ 252/509 |
| 4,112,330 | 9/1978 | Stimson et al. ..................... 315/46 |
| 4,173,731 | 11/1979 | Takagi ............................... 315/58 |
| 4,795,944 | 1/1989 | Stimson ............................. 315/71 |

Primary Examiner—Robert J. Pascal
Assistant Examiner—Arnold Kinkead
Attorney, Agent, or Firm—Randy W. Tung

[57] ABSTRACT

A metal-glass seal resistor composition for use between a terminal member and an electrode member in a resistor spark plug containing by weight of 24 to 33 percent glass, 18 to 25 percent mullite, 36 to 49 percent zirconia, 0.5 to 1.6 percent carbon black, 0 to 2.0 percent bentonite, 0.3 to 0.8 percent sucrose, 0.8 to 1.2 percent lithium carbonate, 0.5 to 1.3 percent antimony and 0.5 to 1.3 percent silicon.

4 Claims, 1 Drawing Sheet

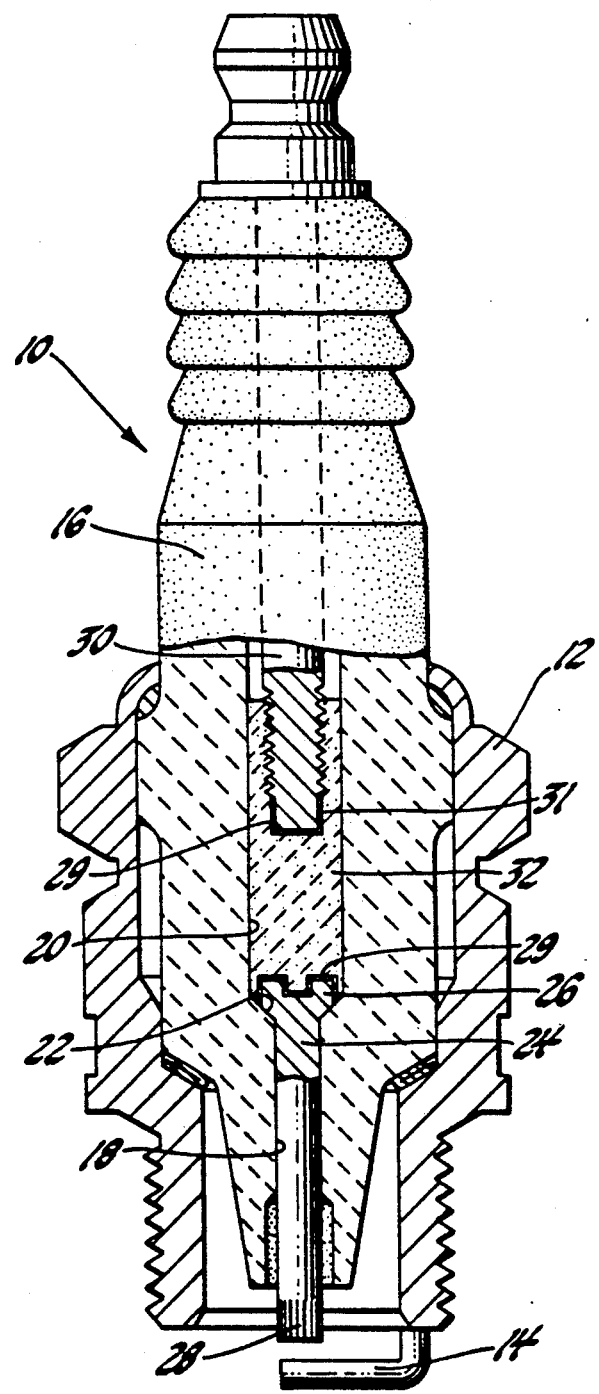

METALLIZED GLASS SEAL RESISTOR COMPOSITION

This invention generally relates to an improved metal-glass seal resistor composition for a resistor spark plug and more specifically, is related to an improvement to the seal composition disclosed in U.S. Pat. No. 4,795,944 issued Jan. 3, 1989 and assigned to the assignee of this application.

BACKGROUND OF THE INVENTION

Resistor spark plugs employ a glassy, relatively high resistance seal material between the terminal screw and the center electrode. During spark plug manufacture, such a seal composition is added as a particulate mixing to the center bore of an insulator body onto the upper end of a previously placed center electrode. A metal terminal screw is then placed in the bore of the insulator so that its lower end rests on top of the particulate composition. The assembly is then fired in a furnace at a relatively high temperature to fuse the glass and soften the material so that the terminal screw can be pushed down into the fused composition.

The firing of the composition produces a fused glassy mass that provides a gas-tight seal in the interior of the spark plug insulator body between the center electrode and the terminal screw. The composition contains metal particles which during the firing operation fuse and provide a bond between the metal conductors and the resistive seal composition.

Metallized glass seal resistor compositions such as those disclosed in U.S. Pat. No. 4,112,330 and U.S. Pat. No. 4,795,944 serve a useful function in the operation of a spark plug in an automobile engine. The high resistance material within the spark plug suppresses the generation of radio frequency electromagnetic radiation which would interfere with radio reception in nearby vehicles. In performing this important function, it is important that the original particulate mixture fuse upon firing to form a mass that has a predictably high level of resistance and that such level of resistance not change appreciably during prolonged usage of the spark plug in engine operation.

The glass metal compositions disclosed in the above-identified U.S. patents have functioned well in millions of spark plugs in automobile engines. Specifically, with the design of more sophisticated automotive ignition systems, the composition disclosed in U.S. Pat. No. 4,795,944 is available which will predictably fire to form resistors with a more narrow resistance range. The formed seals disclosed in U.S. Pat. No. 4,795,944 also maintain resistor values close to their as-fired condition throughout prolonged engine operation.

In the processing of metallized glass seal resistor composition, it has been noticed that since barium borate glass causes an exothermic reaction when water is added during the wet mixing and granulation process, it is frequently necessary for production personnel to test each lot of glass for its heat-up characteristics, i.e., mixing time and temperature. As a consequence, it is frequently necessary to blend various lots of glass together to achieve a constant temperature. The process is, therefore, operator sensitive and requires a great deal of control to make the glass batches consistently.

It is, therefore, an object of the present invention to provide a metallized glass seal resistor composition that enables a gas-tight seal in the interior of the spark plug insulator body between the center electrode and the terminal screw.

It is another object of the present invention to provide a metallized glass seal resistor composition which will predictably fire to form resistors with a more narrow resistance range to suppress the generation of radio frequency electromagnetic radiation.

It is a further object of the present invention to provide a metallized glass seal resistor composition that can be easily processed without requiring a great deal of operator control to achieve batch consistency.

It is yet another object of the present invention to provide a metallized glass seal resistor composition that has lower softening temperature to provide for a more homogeneous composition upon sealing and an improved resistance uniformity.

BRIEF SUMMARY OF THE INVENTION

In accordance with my invention, these and other objects are obtained utilizing a particulate metal-and-glass-containing composition consisting essentially by weight of 24 to 33 percent glass, 18 to 25 percent mullite, 36 to 49 percent zirconia, 0.5 to 1.6 percent carbon black, 0 to 2.0 percent bentonite, 0.3 to 0.8 percent sucrose, 0.8 to 1.2 percent lithium carbonate, 0.5 to 1.3 percent antimony and 0.5 to 1.3 percent silicon. The glass content of this resistor composition is suitably composed of 25 to 50 percent borosilicate glass and about 50 to 75 percent strontium borate glass. It is preferred that the content by weight of the particulate metal constituents, antimony and silicon, be about equal. It is also preferred that the particulate size range of a mixture of these constituents be in the range $-28$ $+100$ mesh.

An advantage of the above-described mixture is that it forms a seal in which the electrical resistance is suitably high and not particularly sensitive to firing time or temperature. It may suitably be fired at a temperature in the range of about 1,650° F. to 1,725° F. in the manufacture of the spark plug. The mixture softens upon fusion of the glass and antimony constituents and forms a seal having a narrow resistance range of approximately 3,000 ohms at room temperature. This narrow resistance range may suitably be controlled to fall anywhere in between 500 ohms to 12,000 ohms. For instance, a frequently used range is from about 4,000 to 7,000 ohms in automotive applications and from about 500 ohms to 3,500 ohms in small air-cooled engine applications. The desirable resistance range may be suitably changed by adjusting the weight percentages of carbon black and sucrose. The resistance decreases with increased amount of carbon black and sucrose. My novel invention provides another unexpected benefit in that the resistance drop of the fused resistive material due to aging in a spark plug in an operating automobile engine is low.

Another advantage of the present invention is that by replacing the barium borate glass with strontium borate glass the latter does not cause an exothermic reaction when water is added during the wet mixing and the granulation process. This presents an important processing advantage because it is no longer necessary for the operator to test each lot of glass for its heat-up characteristics, i.e., mix time and temperature. As a consequence, it will no longer be necessary to blend various lots of glass together in order to achieve a constant temperature and batch consistency. A greater material uniformity is achieved due to the fact that there is no heat-up and, therefore, all batches granulate the same time and temperature.

A further advantage of using the strontium borate glass is that improved resistance uniformity among spark plugs is achieved due to the lower softening temperature of the glass. The strontium borate glass provides for a more homogeneous composition upon sealing and the distribution of the conductive phase is improved by the more fluid or lower viscosity glass.

Other objects and advantages of my invention become more apparent from a detailed description thereof which follows in which reference will be had to the drawing. The drawing shows a spark plug partially broken away to show its internal construction and the location of the subject resistor seal.

BRIEF DESCRIPTION OF THE DRAWING

FIG. 1 is a cross sectional view of a spark plug having a resistor seal 32, positioned in the insulator bore 20. The resistor seal composition being the subject of the invention.

DETAILED DESCRIPTION

Referring to the drawing, the spark plug 10 comprises a conventional outer metal shell 12 having a ground electrode 14 welded to the lower end thereof. Positioned within the metal shell 12 and secured in the conventional manner is the insulator 16. The ceramic insulator 16 may be of a high alumina base material such as covered by U.S. Pat. No. 2,760,875 issued to Karl Schwartzwalder and Helen Blair Barlett. The insulator 16 is formed with a center bore having a lower portion 18 of relatively small diameter and an upper portion 20 of larger diameter which are connected by the insulator center bore ledge 22. Positioned in the lower portion 18 of the insulator center bore is the conventional nickel center electrode 24. The center electrode 24 is preferably nickel although other metals which can be coated with antimony and silicon may be used. The center electrode 24 has an enlarged head 26 at the upper end thereof which rests on the inner insulator center bore ledge 22 and a lower end 28 thereof projecting beyond the lower tip of the insulator 16. Positioned in the upper portion 20 of the insulator center bore is a terminal screw 30. The resistor element or seal 32 of this invention, which will be hereinafter fully described, is positioned in the insulator center bore 20 and is bonded to the center electrode head 26, to the terminal screw 30 and to the inner walls of the ceramic insulator. The center bore ends of the center electrode 26 and the terminal screw 30 have a metal coating 29 thereon which will be hereinafter also fully described. The end of the terminal screw 30 is formed with an unroughened surface 31 for purposes described fully hereinafter.

The resistor seal composition of this invention is a modification of the formulations disclosed in columns 1 and 3 of U.S. Pat. No. 4,795,944. those patented formulations were developed to provide RFI suppression in spark plugs as well as a more narrow resistance range. Millions of spark plugs employing seal formulations described and claimed in that patent have been made and used in automobiles. However, the subject formulation provides dramatic improvements over the U.S. Pat. Nos. 4,122,330 and 4,795,944 formulations both in ease of spark plug manufacture and in spark plug performance.

Following is a preferred formulation for the subject spark plug resistor glass seal:

| MATERIAL | PERCENTAGES BY WEIGHT |
|---|---|
| Strontium broate glass | 19.7 |
| Borosilicate glass | 8.9 |
| Zirconia, $ZrO_2$ | 42.6 |
| Mullite ($-40+100$ particle size) | 21.8 |
| Bentonite | 1.7 |
| Carbon black (Thermax) | 1.4 |
| Sucrose (10-X) | 0.7 |
| Lithium carbonate, $Li_2CO_3$ | 1.0 |
| Antimony, Sb | 1.1 |
| Silicon, Si | 1.1 |

In the above formulation, the strontium borate glass preferably is a composition containing 25 weight percent SrO, 65 weight percent $B_2O_3$ and 7 weight percent $SiO_2$. However, such glasses containing different portions of strontium borate and boron oxide are suitable. The preferred borosilicate glass is a composition containing, in weight percent, $SiO_2$—65 percent, $B_2O_3$—23 percent and $Al_2O_3$—5 percent.

The zirconia is a semiconductor material that contributes to the stabilization of the resistance of the plug. The mullite serves as a filler, the bentonite clay serves as a binder and the lithium carbonate serves as a flux. The composition is initially employed as a powder mixture preferably in the size range of $-28+100$ mesh. During the manufacture of the plug as described above, the mixture is heated to a temperature in the range of about 1,650° F. to 1,725° F. At such temperatures, the glass fuses as does the antimony. The fused glass, together with the other components of the mixture, serves to form a gas impervious seal (32 in the drawing). The zirconia, carbon black and metal levels cooperate to provide suitable electrical resistance. During the fusion of the glass, antimony and silicon coat and bond to the metal terminal and electrode of the spark plug (see 29 in the drawing). The above compositional ranges are critical to obtain the desired benefits of this invention.

Several 1,000-piece spark plug manufacturing runs have been undertaken and compared to a preferred prior art composition within ranges specified in U.S. Pat. No. 4,795,944. During manufacture of the spark plugs, batches of spark plugs are conveyed through a furnace maintained at temperatures in the range of 1,650° F. to 1,725° F. for the purpose of fusing constituents of the seal composition. In large scale day-today continuous operations, it is observed that the temperature in the furnace and the residence time of the spark plugs in the furnace do not vary considerably. This is mainly because that strontium borate glass does not cause an exothermic reaction when water is added during the wet mixing and the granulation process. This presents a major process improvement over the formulation disclosed in U.S. Pat. No. 4,795,944 which contained barium borate glass that required testing by the operator of the heat-up characteristics on each lot of glass and the blending of various lots in order to achieve batch consistency. It is desirable to reduce the sensitivity of the seal material to furnace operation and residence time as well as the relative instability of the resistance of the material during engine operation. The subject seals achieve these goals remarkably well.

The several batches of automotive spark plugs of the above composition consistently had initial resistances following firing of the seal composition in the range of 4,000 to 7,000 ohms. This narrow range of resistance was observed despite wide differences in firing temperature and time at temperature. Thus, the new formulation of this invention reduces the necessity of tight controls on manufacturing operations and provides an improved plug that is more acceptable in automotive vehicles having newer electronic ignition systems. Furthermore, the plugs using the subject seal compositions display much lower reduction in electrical resistance in engine operations. In 100 hours of continuous engine test operation, the average reduction in resistance was much lower than that obtained with the preferred composition of the patented seal formulation.

The subject seal formulations also provided an additional benefit in spark plug manufacturing in that due to the lower softening temperature of strontium borate glass, the glass compositions are more fluid immediately following the firing temperature so that when the terminal posts 30 are pushed into the softened seal mixture 32, there is reduced scrap due to bending of the hot, soft terminal post.

While my invention has been described in which an exclusive property or privilege is claimed are defined as follows.

I claim:

1. A metal-glass seal resistor composition for use between a terminal member and an electrode member in a resistor spark plug, such composition being adapted to provide a narrow range of electrical resistance upon glass sealing in the spark plug and to provide resistance stability thereafter during spark plug use, the composition comprising by weight of 24 to 33 percent glass, 18 to 25 percent mullite, 36 to 49 percent zirconia, 0.5 to 1.6 percent carbon black, 0 to 2.0 percent bentonite, 0.3 to 0.8 percent sucrose, 0.8 to 1.2 percent lithium carbonate, 0.5 to 1.3 percent antimony and 0.5 to 1.3 percent silicon, the glass content of the seal initially comprising by weight about 25 to 50 percent borosilicate glass and about 50 to 75 percent strontium borate glass.

2. A resistor spark plug having a metal-glass seal resistor composition deposited in-between a terminal member and an electrode member, said composition being adapted to provide a narrow range of electrical resistance upon glass sealing in the spark plug and to provide resistance stability thereafter during spark plug use, the composition comprising by weight of 24 to 33 percent glass, 18 to 25 percent mullite, 36 to 49 percent zirconia, 0.5 to 1.6 percent carbon black, 0 to 2.0 percent bentonite, 0.3 to 0.8 percent sucrose, 0.8 to 1.2 percent lithium carbonate, 0.5 to 1.3 percent antimony and 0.5 to 1.3 percent silicon, the glass content of the seal initially comprising by weight about 25 to 50 percent borosilicate glass and about 50 to 75 percent strontium borate glass.

3. A metal-glass seal resistor composition for use between a terminal member and an electrode member in a resistor spark plug, such composition being adapted to provide a narrow range of electrical resistance in-between about 500 ohms to 12,000 ohms upon glass sealing in the spark plug and to provide resistance stability thereafter during spark plug use, the composition consisting essentially by weight of 24 to 33 percent glass, 18 to 25 percent mullite, 36 to 49 percent zirconia, 0.5 to 1.6 percent carbon black, 0 to 2.0 percent bentonite, 0.3 to 0.8 percent sucrose, 0.8 to 1.2 percent lithium carbonate, 0.5 to 1.3 percent antimony and 0.5 to 1.3 percent silicon, the glass content of the seal initially consisting essentially by weight of about 25 to 50 percent borosilicate glass and about 50 to 75 percent strontium borate glass.

4. A resistor spark plug having a metal-glass seal resistor composition deposited in-between a terminal member and an electrode member, said composition being adapted to provide a narrow electrical resistance range in-between about 500 ohms to 12,000 ohms upon glass sealing in the spark plug and to provide resistance stability thereafter during spark plug use, the composition consisting essentially by weight of 24 to 33 percent glass, 18 to 25 percent mullite, 36 to 49 percent zirconia, 0.5 to 1.6 percent carbon black, 0 to 2.0 percent bentonite, 0.3 to 0.8 percent sucrose, 0.8 to 1.2 percent lithium carbonate, 0.5 to 1.3 percent antimony and 0.5 to 1.3 percent silicon, the glass content of the seal initially consisting essentially by weight of about 25 to 50 percent borosilicate glass and about 50 to 75 percent strontium borate glass.

* * * * *